(12) United States Patent
Sugimoto

(10) Patent No.: US 7,764,321 B2
(45) Date of Patent: Jul. 27, 2010

(54) DISTANCE MEASURING APPARATUS AND METHOD

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 541 days.

(21) Appl. No.: 11/730,072

(22) Filed: Mar. 29, 2007

(65) Prior Publication Data
US 2007/0229797 A1 Oct. 4, 2007

(30) Foreign Application Priority Data
Mar. 30, 2006 (JP) ............................. 2006-093302

(51) Int. Cl.
*G03B 13/20* (2006.01)
*G01C 3/04* (2006.01)
(52) U.S. Cl. ...................... 348/345; 348/348; 348/349; 396/79; 396/80
(58) Field of Classification Search ........................ None
See application file for complete search history.

(56) References Cited

U.S. PATENT DOCUMENTS

| 6,308,015 B1 * | 10/2001 | Matsumoto | 396/106 |
| 2001/0008423 A1 * | 7/2001 | Nakamura | 348/345 |
| 2001/0024571 A1 * | 9/2001 | Nakahara | 396/89 |
| 2002/0113884 A1 * | 8/2002 | Tanii et al. | 348/241 |
| 2003/0164892 A1 * | 9/2003 | Shiraishi et al. | 348/349 |
| 2005/0052564 A1 * | 3/2005 | Ishii | 348/345 |
| 2005/0185084 A1 * | 8/2005 | Nonaka et al. | 348/345 |
| 2005/0270410 A1 * | 12/2005 | Takayama | 348/345 |
| 2006/0126894 A1 * | 6/2006 | Mori | 382/103 |
| 2007/0035628 A1 * | 2/2007 | Kanai | 348/159 |

FOREIGN PATENT DOCUMENTS

| JP | 2001-166198 A | 6/2001 |
| JP | 2001-304855 A | 10/2001 |
| JP | 2003-107335 A | 4/2003 |
| JP | 2004-317699 A | 11/2004 |

* cited by examiner

*Primary Examiner*—David L Ometz
*Assistant Examiner*—Dwight Alex C Tejano
(74) *Attorney, Agent, or Firm*—Birch, Stewart, Kolasch & Birch, LLP

(57) ABSTRACT

A distance measuring apparatus and method in which a target subject is detected from image data obtained through imaging, the distance to the object is calculated based on the size of the target subject, and the distance to the target subject is further measured using a distance measuring sensor. Then, a subject distance is determined according to the size of the detected target subject, and based on the distance to the target subject calculated based on the size of the target subject and/or the distance to the target subject obtained by the distance measuring sensor.

4 Claims, 8 Drawing Sheets

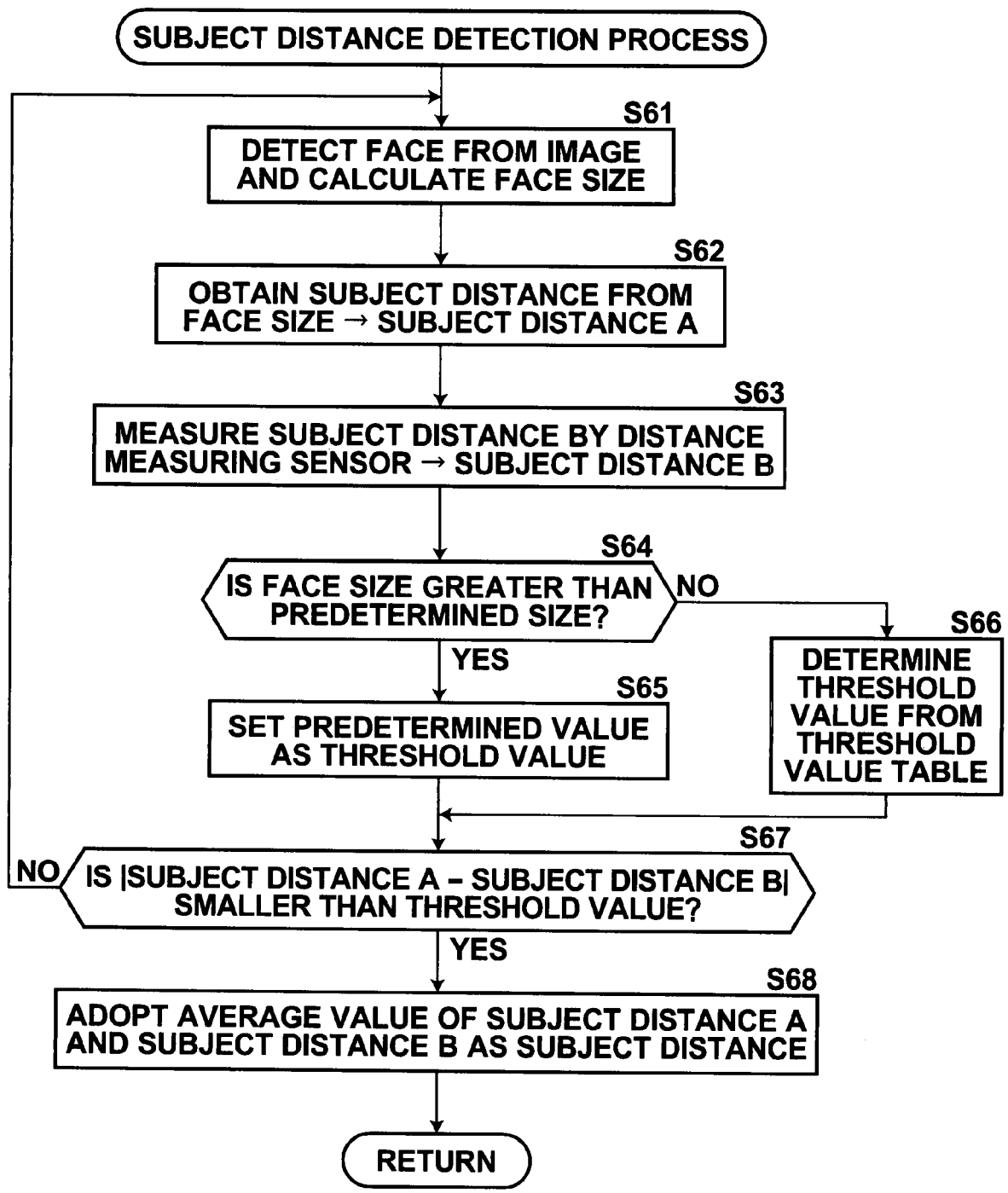

DISTANCE MEASURING APPARATUS AND METHOD

BACKGROUND OF THE INVENTION

1. Field of the Invention

The present invention relates to a distance measuring apparatus and a distance measuring method for use with an imaging apparatus, such as a digital still camera and the like, having a distance measuring function.

2. Description of the Related Art

In imaging devices, such as digital still cameras (digital cameras), digital video cameras, and the like, autofocus (AF) mechanisms for bringing the taking lens into focus on a predetermined subject have been widely use. For performing AF operations, the following methods are known. Namely, a method in which the distance to the subject is measured by a distance measuring sensor install in a digital camera, and an AF operation is performed based on the measurement result. In another method, a face of a person or the like is detected from the image data obtained by an imaging means, such as a CCD or the like, then the distance to the subject is calculated according to the size of the face, and an AF operation is performed using the calculation result.

Further, Japanese Unexamined Patent Publication No. 2001-304855 describes a distance measuring apparatus in which a focusing operation is performed accurately and rapidly by detecting the subject within the imaging screen, and measuring the distance to a specific region determined based on the detection result. Still further, Japanese Unexamined Patent Publication No. 2001-166198 describes another distance measuring apparatus in which a face contour is extracted from the obtained image data, and the distance to the region where the contour was detected is selectively measured to more accurately measure the subject distance.

In cases where the distance is measured solely by the distance measuring sensor as in the methods described in Japanese Unexamined Patent Publication Nos. 2001-304855 and 2001-166198, however, the result obtained by the sensor is sometimes different from the actual distance to the subject.

In the method in which the subject distance is calculated according to the size of a face, the calculation result differs from the actual subject distance if the face is small, and accurate subject distance has not been obtained. In this way, if the distance measurement result by the distance measuring sensor or the calculation result according to the size of a face differs from the actual subject distance, the focusing would not be performed accurately, which has led to the reliability degradation of the AF mechanism.

SUMMARY OF THE INVENTION

The present invention has been developed in view of the circumstances described above, and it is an object of the present invention to provide a distance measuring apparatus and method capable of accurately measuring a subject distance.

In order to solve the problem described above, a distance measuring apparatus of the present invention includes:

an obtaining means for obtaining image data through imaging; a detection means for detecting a target subject from the image data; a calculation means for calculating the distance to the target subject based on the size of the target subject;

a distance measuring means for measuring the distance to the target subject;

a determination means for determining a distance, which is based on the distance to the target subject calculated by the calculation means according to the size of the detected target subject and/or the distance to the target subject measured by the distance measuring means, as the subject distance.

The determination means may be a means that determines the average value of the distance to the target subject calculated by the calculation means and the distance to the target subject measured by the distance measuring means as the subject distance, when the size of the detected target subject is greater than a predetermined size, and the absolute value of difference between the distance to the target subject calculated by the calculation means and the distance to the target subject measured by the distance measuring means is smaller than a predetermined threshold value.

Further, the determination means may be a means that determines the distance to the target subject measured by the distance measuring means as the subject distance, when the size of the detected target subject is smaller than or equal to the predetermined size.

Still further, a configuration may be adopted in which the apparatus further includes a threshold setting means for setting a threshold value based on the size of the target subject; and the determination means determines the average value of the distance to the target subject calculated by the calculation means and the distance to the target subject measured by the distance measuring means as the subject distance, when the absolute value of difference between the distance to the target subject calculated by the calculation means and the distance to the target subject measured by the distance measuring means is smaller than the predetermined threshold value set by the threshold setting means.

Another distance measuring apparatus of the present invention includes:

an obtaining means for moving an imaging optical system, which focuses a subject image on a predetermined imaging surface, along the optical axis directions thereof, and obtaining image data from the subject image focused by the imaging optical system each time the imaging optical system is moved;

a focus evaluation means for calculating a focus evaluation value based on the image data;

a target subject detection means for detecting a target subject from the image data;

a distance calculation means for calculating the distance to the target subject based on the size of the target subject;

a distance measuring means for measuring the distance to the target subject;

a peak value detection means for detecting a peak value from the calculated focus evaluation value; and a determination means for determining either the distance to the target subject calculated by the distance calculation means, or the distance to the target subject measured by the distance measuring means as the subject distance based on the detected peak value.

The determination means may be a means that determines either the distance to the target subject calculated by the distance calculation means, or the distance to the target subject measured by the distance measuring means as the subject distance based on the magnitude of the detected peak value.

Further, the determination means may be a means that determines either the distance to the target subject calculated by the distance calculation means, or the distance to the target subject measured by the distance measuring means as the subject distance based on the width of the detected peak at a predetermined height.

The referent of "width of the detected peak at a predetermined height" as used herein means, for example, a half bandwidth.

A distance measuring method of the present invention is a method for use with a measuring apparatus including:

an obtaining means for obtaining image data through imaging;

a detection means for detecting a target subject from the image data;

a calculation means for calculating the distance to the target subject based on the size of the target subject; and a distance measuring means for measuring the distance to the target subject, wherein a distance, which is based on the distance to the target subject calculated by the calculation means according to the size of the detected target subject and/or the distance to the target subject measured by the distance measuring means, is determined as the subject distance.

Another distance measuring method of the present invention is a method for use with a measuring apparatus including:

an obtaining means for moving an imaging optical system, which focuses a subject image on a predetermined imaging surface, along the optical axis directions thereof, and obtaining image data from the subject image focused by the imaging optical system each time the imaging optical system is moved;

a focus evaluation means for calculating a focus evaluation value based on the image data;

a target subject detection means for detecting a target subject from the image data;

a distance calculation means for calculating the distance to the target subject based on the size of the target subject; and a distance measuring means for measuring the distance to the target subject, wherein the method includes the steps of:

detecting a peak value from the calculated focus evaluation value; and determining either the distance to the target subject calculated by the distance calculation means, or the distance to the target subject measured by the distance measuring means as the subject distance based on the detected peak value.

When obtaining a subject distance using the size of a detected target subject and measurement result obtained by the distance measuring means, the reliability of the distance measurement result may be improved by changing the way of obtaining the subject distance according to the size of the target subject (i.e., depending on whether the object is within a short distance or in a remote place). If the distance measurement result is accurate, the in-focus position may be determined accurately, thereby the performance of the imaging apparatus may be improved.

BRIEF DESCRIPTION OF THE DRAWINGS

FIG. 10 is a flowchart for explaining the flow of a subject distance detection process according to a third embodiment.

DESCRIPTION OF THE PREFERRED EMBODIMENTS

Hereinafter, exemplary embodiments of the present invention will be described with reference to the accompanying drawings. In the embodiments, a digital camera will be described, by way of example, as an electronic device having the distance measuring apparatus of the present invention. But it will be appreciated that the application scope of the present invention is not limited to this, and the present invention is applicable to other electronic devices having electronic imaging functions, such as cell phones with camera functions, PDAs with camera functions, and the like.

First Embodiment

Figure 1:
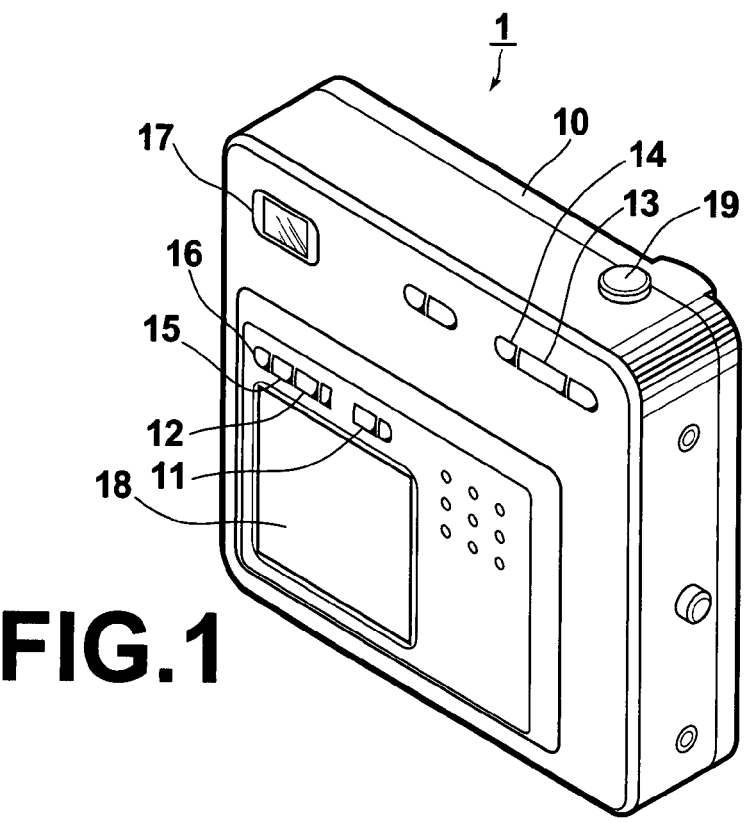
FIG. 1 is a rear view of a digital camera.
Figure 2:
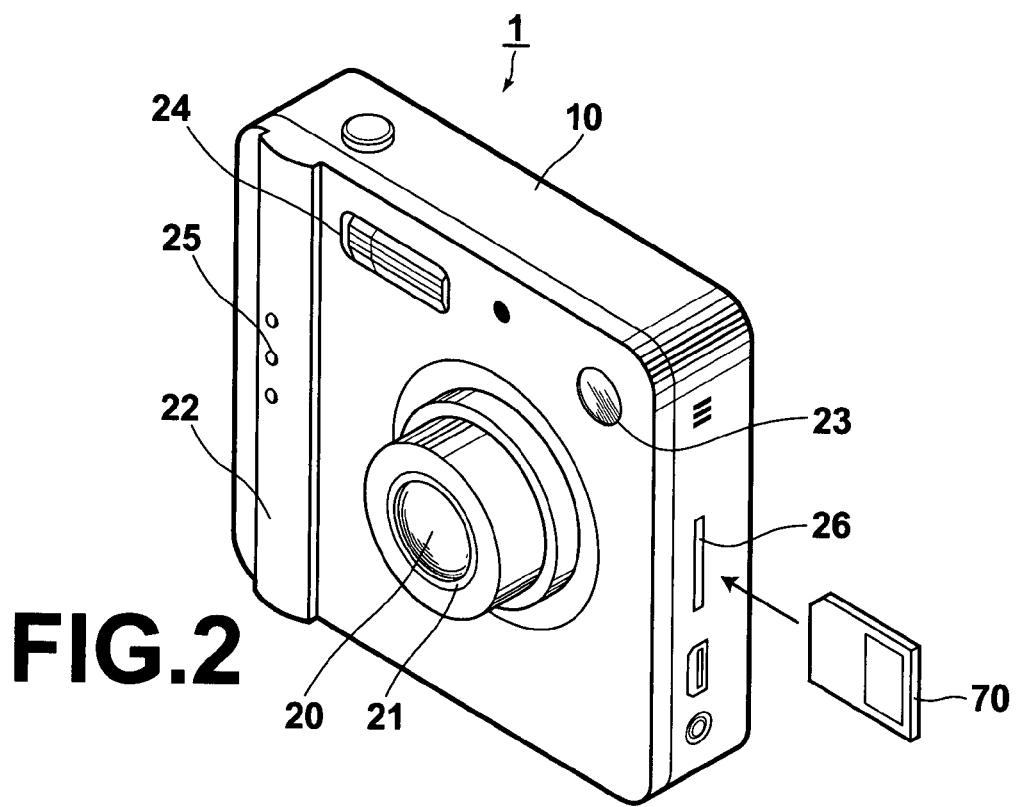
FIG. 2 is a front view of the digital camera.

FIGS. 1 and 2 illustrate an example digital camera. FIG. 1 is an external view thereof viewed from the rear side, and FIG. 2 is an external view thereof viewed from the front side. An operation mode switch 11; a menu/OK button 12; a zoom/up-down lever 13; a right-left button 14; a back (return) button 15; display switching button 16; a finder 17 for imaging; and a monitor 18 for imaging and playback are provided on the rear side of the main body 10 of the digital camera 1 as the operation interface for the user as shown in FIG. 1. In addition, a shutter button 19 is provided on the upper side of the main body 10.

The operation mode switch 11 is a slide switch for selecting still image recording mode, moving picture imaging mode, or playback mode. The menu/OK button 12 is a button for selecting imaging mode, flash emission mode, or displaying various menus on the monitor 18 for setting the number of recording pixels, sensitivity and the like, which are sequentially selected by depressing the button, and also for determining the selection/setting based on the menu displayed on the monitor 18.

The zoom/up-down lever 13 is moved in up/down directions when performing telephoto/wide angle control at the time of imaging, and performing cursor control on the menu screen displayed on the monitor 18 at the time of performing various settings. The right-left button 14 is used for moving the cursor in right/left directions on the menu screen displayed on the monitor 18 at the time of performing various settings.

The back (return) button 15 is depressed when terminating the various settings and displaying an immediately preceding screen on the monitor 18. The display switching button 16 is depressed when performing display ON/OFF switching of the monitor 18, displaying various guidance, performing character display ON/OFF switching, and the like. The finder 17 is provided for the user for monitoring and verifying the image composition and focus when imaging a subject. The subject image monitored through the finder 17 is provided through a finder window 23 provided on the front side of the main body 10.

The setting contents of each of the buttons and levers described above may be confirmed by a display on the monitor 18, a lamp within the finder 17, the position of the slide levers, or the like. Further, when performing imaging, a through image for confirming the subject is displayed on the monitor 18. Thus, the monitor functions as an electronic view finder, as well as functioning as a display for replaying obtained still images or a moving image, or displaying various menus.

As shown in FIG. 2, a taking lens (imaging optical system) 20, a lens cover 21, a power switch 22, the finder window 23, a flashlight 24, and a self-timer lamp 25 are provided on the front side of the main body 10. In addition, a media slot 26 is provided on a lateral side thereof.

The taking lens 20 is a lens for focusing a subject on a predetermined imaging surface (e.g., CCD provided inside of the main body 10, or the like), and includes a focus lens, a zoom lens, and the like. The lens cover 21 is provided for covering the surface of the taking lens 20 to protect it from contamination, dust, and the like when the digital camera 1 is inactive, in playback mode, or the like. The power switch 22 is a switch for activating or deactivating the digital camera 1. The flashlight 24 is provided for instantaneously irradiating light to the subject required for imaging when the shutter button 19 is depressed and while the shutter provided inside of the main body is open. The self-timer lamp 25 is provided for notifying the timing of open/close of the shutter when performing imaging using the self-timer. The media slot 26 is provided for inserting an external recording medium 70, such as a memory card, or the like. When the external recording medium 70 is inserted therein, data read/write operations are performed.

Figure 3:
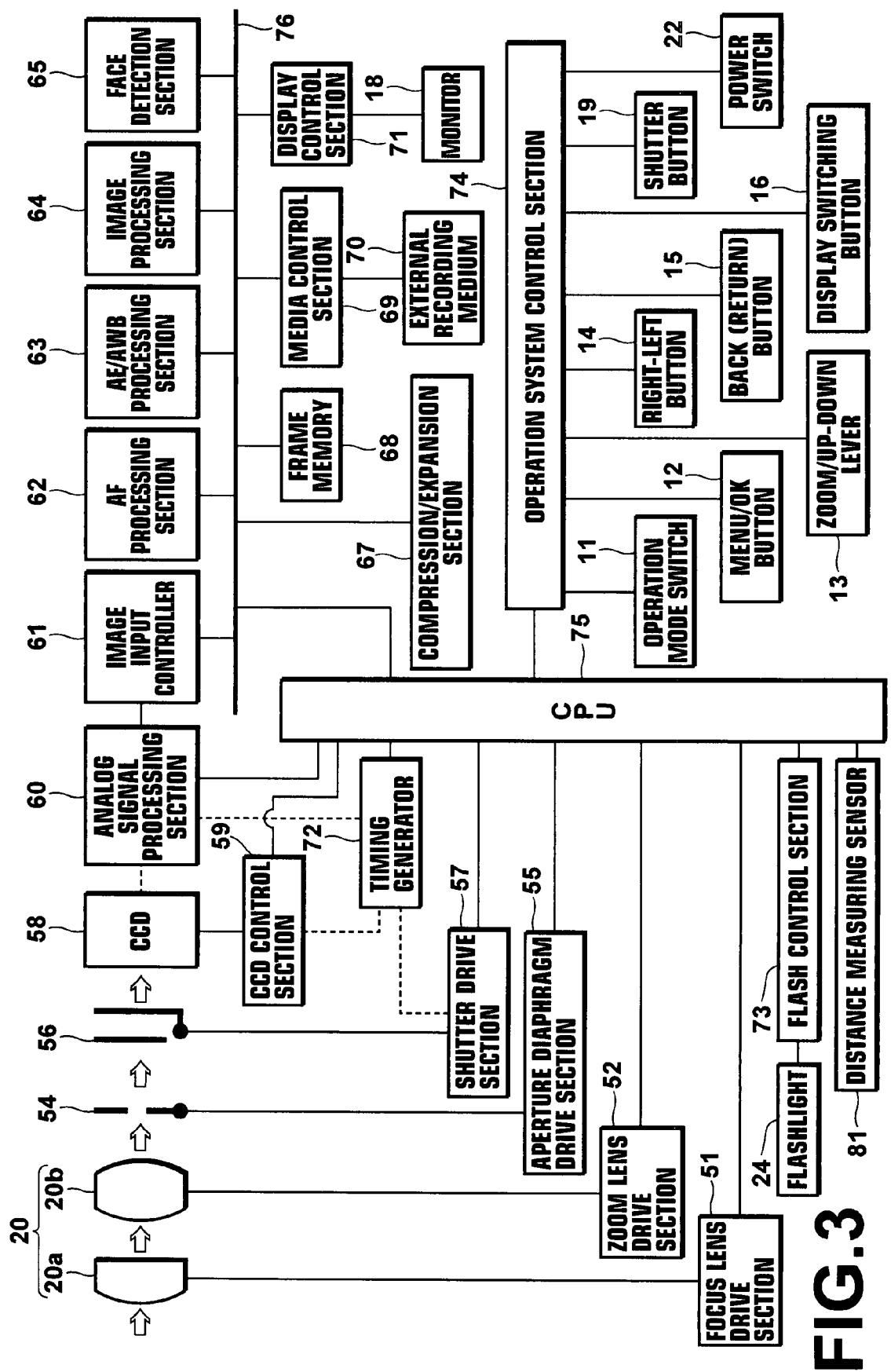
FIG. 3 is a functional block diagram of the digital camera.

FIG. 3 is a functional block diagram of the digital camera 1. The digital camera 1 includes: the operation mode switch 11; the menu/OK button 12; the zoom/up-down lever 13; the right-left button 14; the back (return) button 15; the display switching button 16; the shutter button 19; and the power switch 22 as the operation system thereof, in addition to the operation system interface 74 for conveying the operated states of these switches, buttons, and levers to the operation control section 75 as shown in FIG. 3.

The taking lens 20 includes a focus lens 20a and a zoom lens 20b. The lenses 20a and 20b are movable in the optical axis directions through step driving by a focus lens drive section 51 and a zoom lens drive section 52 respectively, each including a motor and a motor driver. The focus lens drive section 51 step drives the focus lens 20a based on focus drive amount data outputted from an AF processing section 62. The zoom lens drive section 52 controls the step driving of the zoom lens 20b based on operated amount data of the zoom/up-down lever 13.

An aperture diaphragm 54 is driven by an aperture diaphragm drive section 55 that includes a motor and a motor driver. The aperture diaphragm drive section 55 regulates the aperture diameter of the aperture diaphragm based on aperture value data outputted from an AE (Automatic Exposure)/AWB (Automatic White Balance) processing section 63.

A shutter 56 is a mechanical shutter, and is driven by a shutter drive section 57 which includes a motor and a motor driver. The shutter drive section 57 performs open/close control of the shutter 56 based on a depressed signal of the shutter 19 and shutter speed data outputted from the AE/AWB processing section 63.

A CCD 58, the image sensor of the digital camera 1, is provided on the rear side of the optical system described above. The CCD 58 has a photoelectric surface that includes multitudes of light receiving elements disposed in a matrix form, and the subject image transmitted through the optical system is focused on the photoelectric surface and subjected to a photoelectric conversion. A microlens array (not shown) for directing light to respective pixels, and a color filter array (not shown) including R, G, and B filters arranged regularly are disposed in front of the photoelectric surface. The CCD 58 reads out charges stored in the respective pixels line by line in synchronization with a vertical transfer clock signal and a horizontal transfer clock signal supplied from a CCD control section 59, and outputs the charges as image signals. The charge storage time of each pixel (exposure time) is determined by an electronic shutter drive signal supplied from the CCD control section 59.

The image signals outputted from the CCD 58 are inputted to an analog signal processing section 60. The analog signal processing section 60 includes: a correlated double sampling circuit (CDS) for removing noise from the image signals; an automatic gain controller (AGC) for regulating the gain of the image signals; and an A/D converter (ADC) for converting the image signals to digital image data. The digital image data are CCD-RAW data in which each pixel has RGB density values.

A timing generator 72 is provided for generating timing signals, which are inputted to the shutter drive section 57, CCD control section 59, analog signal processing section 60, thereby the operation of the shutter button 19, open/close of the shutter 56, charge acquisition of the CCD 58, and the processing in the analog signal processing section 60 are synchronized. The flash control section 73 controls the emission of the flashlight 24.

The image input controller 61 stores the CCD-RAW data inputted from the analog signal processing section 60 in the frame memory 68. The frame memory 68 is a work memory used when various types of digital image processing (signal processing) are performed, and may be, for example, a SDRAM (Synchronous Dynamic Random Access Memory) that performs data transfer in synchronization with a bus clock signal having a constant frequency.

The display control section 71 is provided for causing the monitor 18 to display the image data stored in the frame memory as a through image. For example, the display control section 71 combines a luminance (Y) signal and a color (C) signal into a single composite signal, and outputs the composite signal to the monitor 18. Through images are obtained at predetermined time intervals and displayed on the monitor 18 while the imaging mode is selected. In addition, the display control section 71 causes the monitor 18 to display an image which is based on image data included in the image file stored in the external recording medium 70 and read out by a media control section 69.

The AF processing section (distance measuring means) 62, and AE/AWB processing section 63 determine imaging conditions based on a pre-image. The pre-image is an image based on the image data stored in the frame memory 68 as a result of pre-imaging performed by the CCD 58, which is caused by a CPU 75 that detects a halfway depressed signal generated when the shutter button 19 is depressed halfway.

The AF processing section 62 detects the in-focus position based on the pre-image, and outputs focus drive section data. As the in-focus position detection method, the present embodiment employs the passive system that detects the in-focus position based on a focus evaluation value (contrast value) of an image, which increases when the image is brought into focus.

The AE/AWB processing section 63 measures the luminance of the subject based on the pre-image to determine the aperture value, shutter speed, and the like, and outputs aperture value data and shutter speed data (AE), as well as automatically correcting white balance at the time of imaging (AWB).

The image processing section 64 performs image quality corrections, such as gamma correction, sharpness correction, contrast correction, and the like on the image data of a final image. In addition, it performs YC processing in which CCD-RAW data are converted to Y data, which are luminance signal data, and YC data that include Cb data, which are blue chrominance difference signals, and Cr data, which are red chrominance difference signals. The referent of "final image" as used herein means an image based on the image data stored in the frame memory 68 which are obtained by the CCD 58 when the shutter button is fully depressed and outputted therefrom as image signals and stored in the frame memory through the analog signal processing section 60 and the image input controller 61. The upper limit of the number of pixels of the final image is dependent on the number of pixels of the CCD 58. But the number of pixels for recording may be changed, for example, by image quality setting allowed to the user (fine, normal, or the like). In the mean time, the number of pixels for a through image or a pre-image may be less than that of a final image, e.g., $\frac{1}{16}$ of the final image.

The compression/expansion section 67 generates an image file by performing compression, for example, in JPEG format on the image data after processed by the image processing section 64 for image quality corrections. Auxiliary information is added to the image file based on various data formats. Further, the compression/expansion section 67 reads out a compressed image file from the external recording medium 70 and performs expansion thereon in the playback mode. The expanded image data are outputted to the display control section 71, which causes the monitor 18 to display an image based on the image data.

The media control section 69 corresponds to the media slot 26 in FIG. 2, and reads out an image file or the like recorded on the external recording medium 70, or records an image file thereon.

The CPU 75 controls each section of the main body of the digital camera 1 in response to the signals from various buttons, levers, switches, and each of the functional blocks. The data bus 76 is connected to the image input controller 61, various processing sections 62 to 67, frame memory 68, various control sections 69 and 71, and CPU 75, and transmission and reception of various signals and data are performed through the data bus 76.

The distance measuring sensor 81 is a triangular distance measuring sensor that irradiates light from the light emission section thereof, receives the light reflected back from the subject by the light receiving section thereof, and calculates the distance to a subject from an angle formed between the light emission section and light receiving section. The calculated distance measurement result is outputted to the CPU 75.

Figure 4:
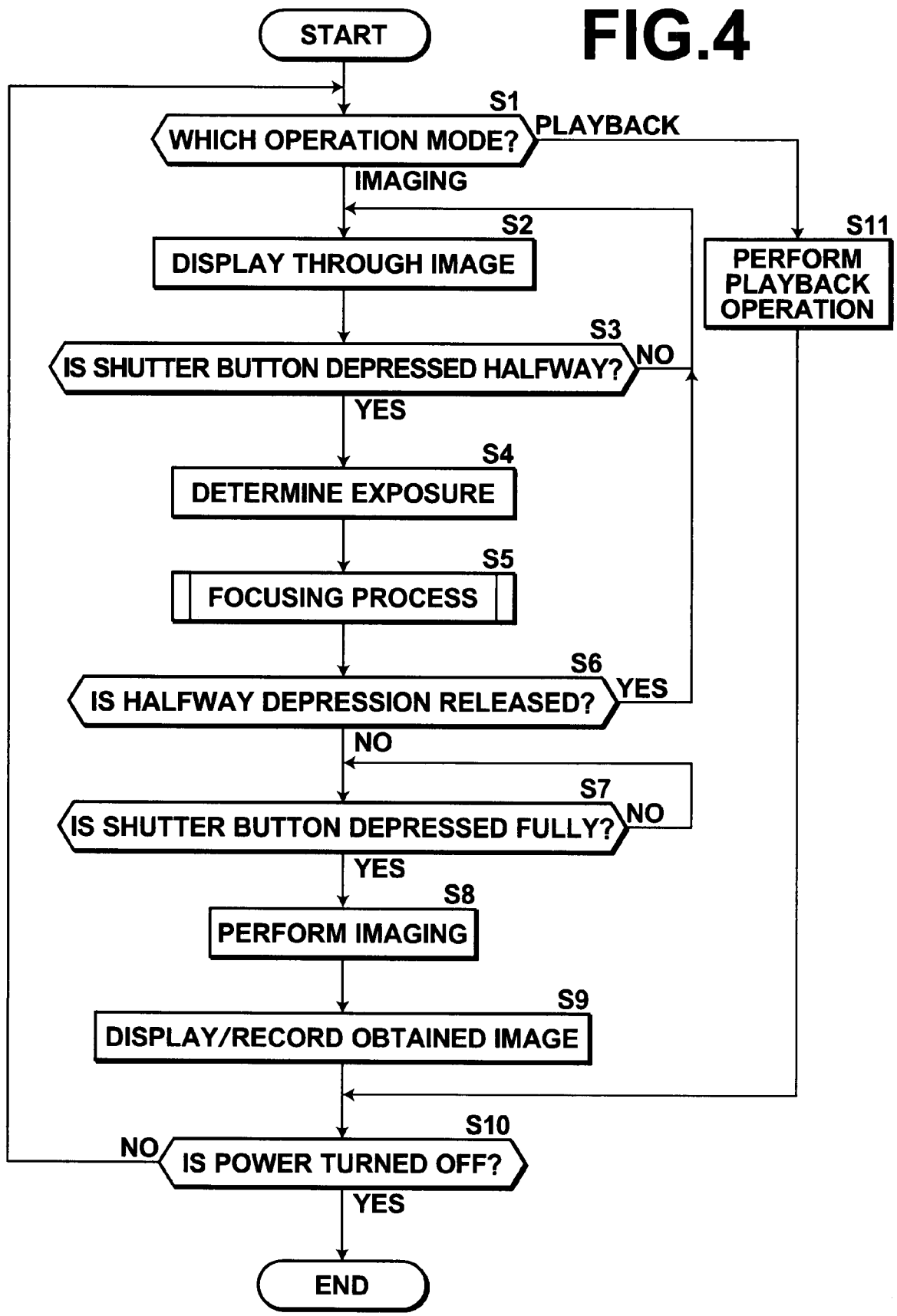
FIG. 4 is a flowchart for explaining a process sequence performed within the digital camera.

A brief process sequence performed within the digital camera 1 will now be described with reference to the flowchart illustrated in FIG. 4. First, a determination is made by the CPU 75 whether the operation mode is imaging mode or playback mode according to the setting of the operation mode switch 11 (step S1). If the operation mode is playback mode (step S1: Playback), a playback operation is performed (step S11). In the playback operation, an image file is read out by the media control section 69 from the external recording medium 70, and an image based on the image data included in the image file is displayed on the monitor 18. When the playback operation is completed, a determination is made by the CPU 75 whether deactivation operation is performed through the power switch 22 of the digital camera 1 (step S10). If the determination result is positive (step S9: YES), the power of the digital camera 1 is turned off and the process is terminated.

In the mean time, if the operation mode is determined to be imaging mode in step S1 (step S1: Imaging), display control of a through image is performed by the CPU 75 (step S2). The display of the through image means that the pre-image described above is displayed on the monitor 18. Then, a determination is made by the CPU 75 whether the shutter button 19 is depressed halfway (step S3). If the determination result is negative (step S3: NO), the processing in step S3 is repeated by the CPU 75. If the determination result is positive (step S3: YES), the exposure is determined by the AE/AWB processing section 63 (step S4).

Then, a focusing process is performed (step S5), which will be described in detail later. After the focusing process is performed, a determination is made whether the halfway depression of the shutter button 19 is released (step S6). If the determination result is positive (step S6: YES), the process returns to step S2. If the determination result is negative (step S6: NO), a determination is made by the CPU 75 whether the shutter button is fully depressed (step S7). If the determination result is negative (step S7: NO), the processing in step S7 is repeated, and if the determination result is positive (step S7: YES), an imaging process is performed by the CPU 75 (step S8). The referent of "imaging process" as used herein means a process that includes processing until analog image data based on a subject image focused on the photoelectric surface of the CCD 58 are A/D converted, and various signal processing is performed thereon by the image processing section 64. Further, the imaging process may include the compression/expansion by the compression/expansion section 67 on the processed image data to generate an image file.

After the imaging process is completed, the processing for displaying the obtained image on the monitor 18 or recording the image on the external recording medium 70 is performed by the CPU 75 (step S9). Then, a determination is made by the CPU 75 whether deactivation operation is performed through the power switch 22 (step S10). If the determination result is positive (step S10: YES), the power of the digital camera 1 is turned off, and the process is terminated. If the determination result is negative (step S10: NO), the process returns to step S1.

Figure 5:
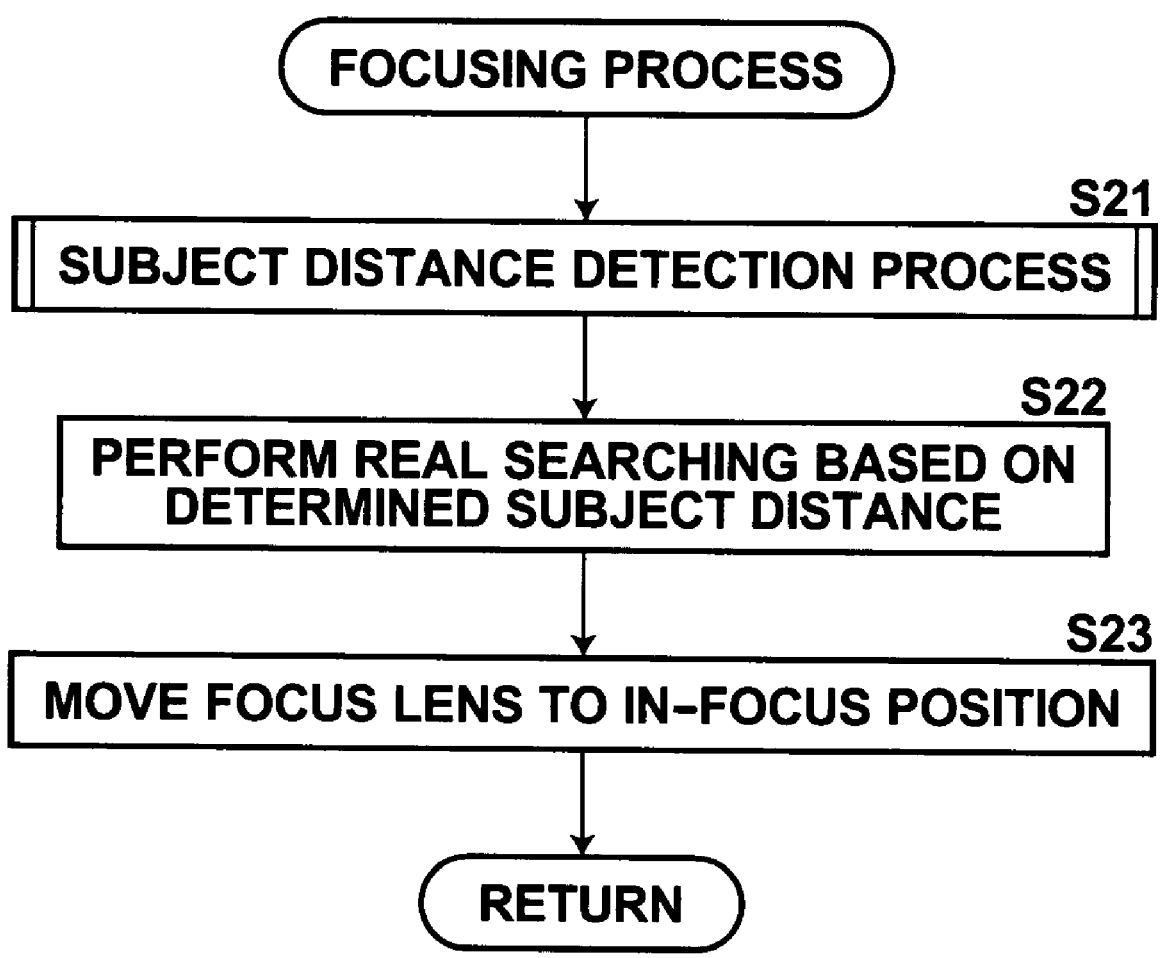
FIG. 5 is a flowchart for explaining the flow of a focusing process.
Figure 6:
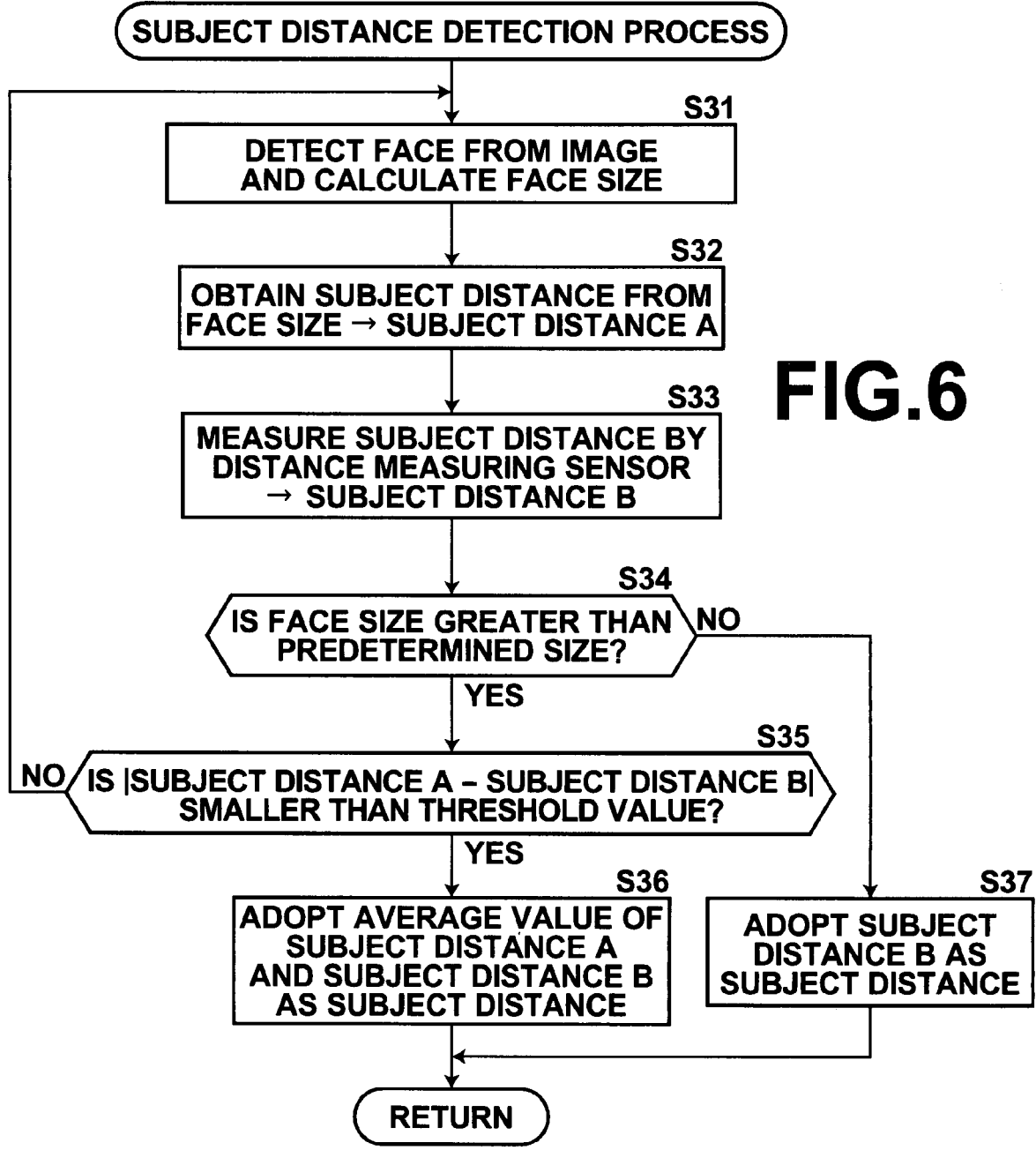
FIG. 6 is a flowchart for explaining the flow of a subject distance detection process according to a first embodiment.

The flow of focusing process will now be described with reference to the flowchart illustrated in FIG. 5. First, a subject distance detection process is performed by the CPU 75 (step S21). FIG. 6 illustrates the flow of subject distance detection process. The focus lens 20a is moved to a predetermined position by the CPU 75 through the focus lens drive section 51. Then, the CPU 75 causes the face detection section 65 to detect a face of a person from image data generated based on a subject image focused on the photoelectric surface of the CCD 58, calculates the size of the face (step S31), and obtains a subject distance "A" from the calculated size of the face (step S32). The data indicating the correlation between the face size and subject distance may be stored in advance, for example, in a storage section not shown in FIG. 3. Alternatively, the subject distance may be calculated from the face size using a predetermined formula. In the present embodiment, the description will be continued on the assumption that a face of a person is detected and the subject distance "A" is obtained according to the size of the face. Alternatively, however, the eyes of a person may be detected and the subject distance "A" is obtained according to the size of the eyes, or the distance between the eyes.

Thereafter, the CPU 75 causes the distance measuring sensor 81 to measure the subject distance, and the measurement result is adopted as the subject distance "B" (step S33). Then, a comparison is made by the CPU 75 whether the face size calculated in step S31 is greater than a predetermined size (step S34). If the comparison result is positive (step S34: YES), a comparison is made by the CPU 75 whether the absolute value of difference between the subject distance "A"

and subject distance "B" is smaller than a predetermined threshold value (step S35). If the comparison result is positive (step S35: YES), the average value of the subject distance "A" and subject distance "B" is calculated, and the calculated average value is adopted as the subject distance (step S36). Thereafter, the subject distance detection process is terminated. Note that a weighted average calculated by weighting each of the subject distances (e.g., (subject distance "A"×a+ subject distance "B"×b), "a" and "b" are integer values greater than or equal to one) may be adopted as the subject distance, other than the simple arithmetic average.

If the comparison result is negative (step S35: NO), that is, if the absolute value of difference between the subject distance "A" and subject distance "B" is greater than or equal to the predetermined threshold value, the process returns to step S31. The reason for this is that the difference between the subject distance "A" calculated from the face size, and the subject distance "B" measured by the distance measuring sensor 81 is excessively great, so that each of the subject distances is recalculated/re-measured. Note that the repeating count for the calculation of the subject distance "A" and measuring of the subject distance "B" may be predetermined, and if the repeating count exceeds the predetermined value, the subject distance "B" may be adopted as the subject distance.

In the mean time, if the face size is smaller than or equal to a predetermined size in step S34. (step S34: NO), the subject distance "B" is adopted as the subject distance (step S37) and the subject distance detection process is terminated by the CPU 75. When the face size is smaller than or equal to the predetermined size, it means that the person is in a remote place, so that the subject distance "A" calculated from the face size may differ greatly from the actual distance. Accordingly, the subject distance "A" is disregarded, and the subject distance "B" measured by the distance measuring sensor 81 is adopted as the subject distance.

Now returning to FIG. 5, when the subject distance detection process in step S21 is completed, the CPU 75 performs various control operations for performing a real searching process based on the determined subject distance (step S22). That is, adopting the position corresponding to the subject distance as the preliminary in-focus position, the CPU 75 causes the focus lens 20a to be step driven within a predetermined range including the preliminary in-focus position, and calculates focus evaluation values from the obtained image data to select a position where the focus evaluation value is maximal. Then, the selected position is adopted as the in-focus position, and the focus lens 20a is moved to the in-focus position (step S23). Thereafter the focusing process is terminated.

When obtaining a subject distance using the size of a detected face and measurement result obtained by the distance measuring sensor 81 in the manner as described above, the reliability of the distance measurement result may be improved by changing the way of obtaining the subject distance according to the size of the face (i.e., depending on whether the person is within a short distance or a remote place). If the distance measurement result is accurate, the in-focus position may be determined accurately, thereby the performance of the digital camera 1 may be improved.

Second Embodiment

In the first embodiment, a method, in which the way of obtaining the subject distance is changed according to the size of a face, is described. In the second embodiment, a method in which peak values are detected from focus evaluation values, and either the subject distance "A" calculated from the size of a face or subject distance "B" measured by the distance measuring sensor 81 is adopted will be described. The external view, functional block, major process sequence, and focusing process of the digital camera 1 in the second embodiment are identical to those in the first embodiment explained using FIGS. 1 to 5. Therefore, they will not be elaborated upon further here, and only a subject distance detection means will be described.

Figure 7:
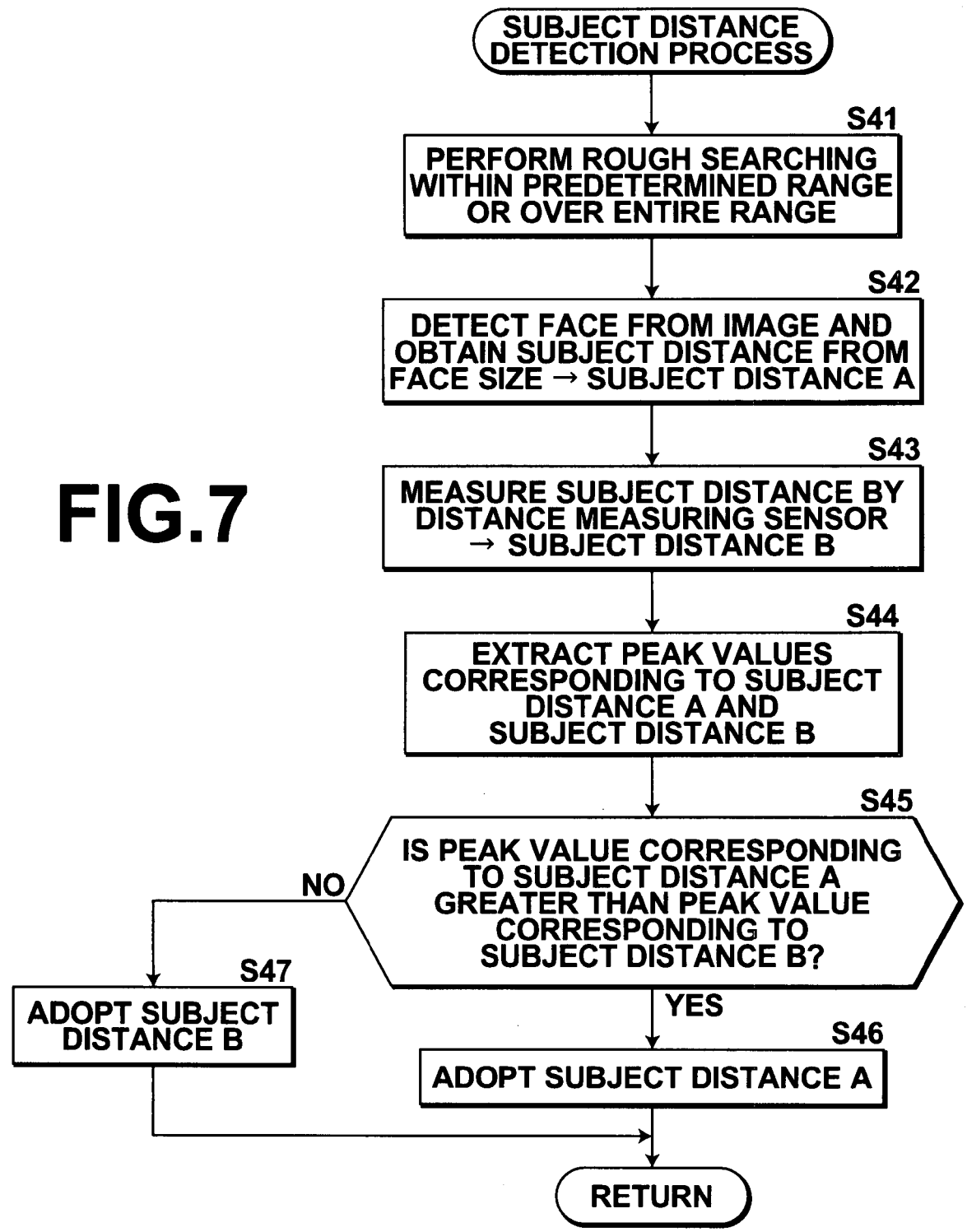
FIG. 7 is a flowchart for explaining the flow of a subject distance detection process according to a second embodiment.

FIG. 7 is a flowchart illustrating the flow of a subject distance detection process according to the second embodiment. First, the CPU 75 performs various control operations for performing rough searching process over the entire range from the near end to infinity end or within a predetermined range (step S41). The referent of "rough searching process" as used herein means that the focus lens 20a is moved by step driving over the entire range from the near end to infinity end or within a predetermined range, and a focus evaluation value is calculated from image data in each step movement to obtain peak values from the calculated focus evaluation values.

Then, the CPU 75 causes the focus lens 20a to be moved to a predetermined position and the face detection section 65 to detect a face of a person from the obtained image data, and obtains a subject distance "A" from the face size (step S42). In addition, the CPU 75 causes the distance measuring sensor 81 to measures the subject distance, and the measurement result is adopted as a subject distance "B" (step S43).

Next, a peak value corresponding to the subject distance "A" and a peak value corresponding to the subject distance "B" are extracted from the peak values detected in step S41 (step S44). Then, a comparison is made between the magnitude of the peak value corresponding to the subject distance "A" and the magnitude of the peak value corresponding to the subject distance "B" (step S45). If the peak value corresponding to the subject distance "A" is greater than the peak value corresponding to the subject distance "B" (step S45: YES), the subject distance "A" is adopted by the CPU 75 as the subject distance (step S46), and the subject distance detection process is terminated. If the peak value corresponding to the subject distance "B" is greater than the peak value corresponding to the subject distance "A" (step S45: NO), the subject distance "B" is adopted by the CPU 75 as the subject distance (step S47), and the subject distance detection process is terminated.

Figure 8:
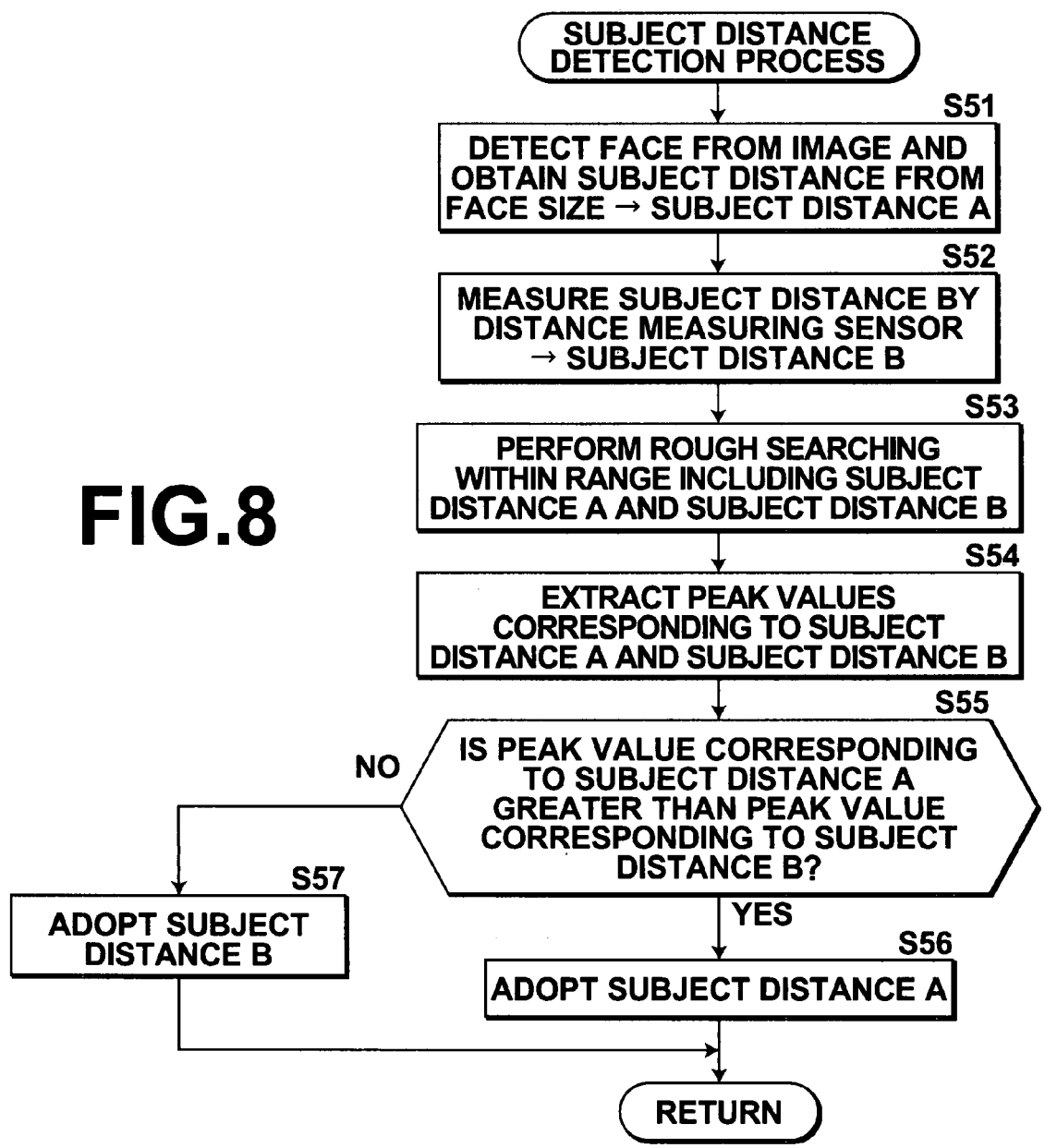
FIG. 8 is a flowchart for explaining the flow of a subject distance detection process according to a second embodiment.

An alternative method is that only the adjacent regions of the position of the subject distance "A" calculated from the size of a face and the position of the subject distance "B" measured by the distance measuring sensor 81 are rough searched, and peak values are obtained to determined the subject distance. FIG. 8 is a flowchart illustrating a modified example of the subject distance detection process according to the second embodiment.

First, CPU 75 causes the focus lens 20a to be moved to a predetermined position and the face detection section 65 to detect a face of a person from the obtained image data, and obtains a subject distance "A" from the face size (step S51). In addition, the CPU 75 causes the distance measuring sensor 81 to measures the subject distance, the measurement result is adopted as a subject distance "B" (step S52).

Figure 9A:
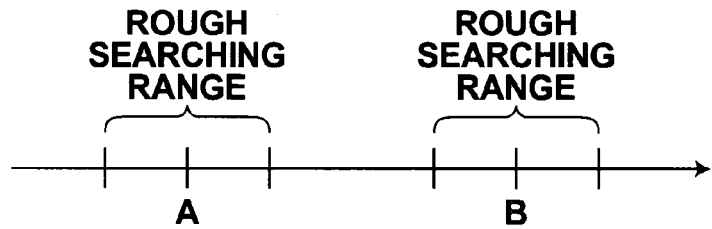
FIGS. 9A and 9B are drawings for explaining rough searching ranges.
Figure 9B:
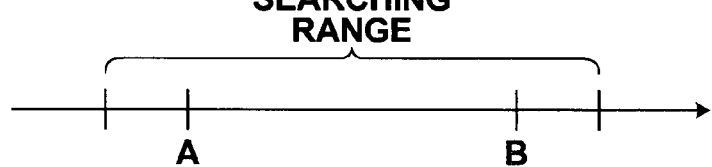

Then, the CPU 75 performs various control operations for performing a rough searching process within a range including the subject distances "A" and "B" (step S53). The range including the subject distances "A" and "B" may be ranges adjacent to the positions of the subject distances "A" and "B" respectively as shown in FIG. 9A, or a range from a position slightly near side of the position of the subject distance "A" to a position slightly infinity side of the position of the subject distance "B" as shown in FIG. 9B. In the rough searching range, focus evaluation values are calculated and peak values are detected.

Thereafter, a peak value corresponding to the subject distance "A", and a peak value corresponding to the subject distance "B" are extracted by the CPU 75 (step S54), and a comparison is made between the magnitude of the peak value corresponding to the subject distance "A" and the magnitude of the peak value corresponding to the subject distance "B" (step S55). If the peak value corresponding to the subject distance "A" is greater than the peak value corresponding to the subject distance "B" (step S55: YES), the subject distance "A" is adopted by the CPU 75 as the subject distance (step S56), and the subject distance detection process is terminated. On the other hand, if the peak value corresponding to the subject distance "B" is greater than the peak value corresponding to the subject distance "A" (step S55: NO), the subject distance "B" is adopted by the CPU 75 as the subject distance (step S57), and the subject distance detection process is terminated.

In the description above, the comparison is made between the magnitude of the peak value corresponding to the subject distance "A" and the magnitude of the peak value corresponding to the subject distance "B". But, for example, half bandwidths of the respective peak values may be compared.

When obtaining the subject distance using the subject distance "A" calculated from the size of a face, and subject distance "B" measured by the distance measuring sensor 81 in the manner as described above, accurate subject distance may be selected by adopting either one of them according to the magnitude of the peak value or the half bandwidth thereof, and the reliability of the distance measurement result may be improved. When the distance measurement result is accurate, the in-focus position may be determined accurately, thereby the performance of the digital camera 1 may be improved.

Third Embodiment

In the third embodiment, a method in which the subject distance is determined by varying a threshold value, for determining whether the difference between the subject distance "A" calculated from the size of a face and subject distance "B" measured by the distance measuring sensor 81 is within an allowable range, according to the size of a face will be described. The external view, functional block, major process sequence, and focusing process of the digital camera 1 in the third embodiment are identical to those in the first embodiment explained using FIGS. 1 to 5. Therefore, they will not be elaborated upon further here, and only a subject distance detection means will be described.

FIG. 10 is a flowchart illustrating the flow of a subject distance detection process according to the third embodiment. First, the CPU 75 moves the focus lens 20a to a predetermined position through the focus lens drive section 51, and causes the face detection section 65 to detect a face of a person from the obtained image data, thereby the size of the face is calculated (step S61). Then, a subject distance "A" is obtained from the calculated face size (step S62).

Then, the CPU 75 causes the distance measuring sensor 81 to measures the subject distance, the measurement result is adopted as a subject distance "B" (step S63). A comparison is made by the CPU 75 between the face size calculated in step S61 and a predetermined size (step S64). If the face size is greater than the predetermined size (step S64: YES), a predetermined value is set as the threshold value (step S65). If the face size is smaller than or equal to the predetermined size (step S64: NO), the CPU 75 reads out a threshold value for use from a threshold value table according to the face size (step S66). Here, the threshold value table is a data table stored in a storage section (not shown) in advance, and the data are arranged such that the smaller the size of a face, the greater the threshold value. When the face size is greater than the predetermined size, it means that the person is within a short distance, and the subject distance "A" may be calculated relatively accurately, so that the threshold value is set to a small value (i.e., the allowable range of difference between the subject distance "A" and subject distance "B" is set narrowly). On the other hand, if the face size is smaller than or equal to the predetermined size, it means that the person is in a relatively remote place, so that the difference between the subject distance "A" and actual distance may become relatively great. Therefore, the threshold value is set to a great value (i.e., the allowable range of difference between the subject distance "A" and subject distance "B" is set broadly). That is, the threshold value read out from the threshold value table in step S66 is greater than the predetermined threshold value in step S65.

In the present embodiment, a comparison is made in step 64 between the size of a face and a predetermined size to determine either the predetermined threshold value or a threshold value selected from the threshold value table is used. Alternatively, a threshold value may be selected from the threshold value table according to the size of a face without performing the comparison. That is, the threshold value table includes threshold data correlated to each of all of possible face sizes. Further, the subject distance may be calculated from the face size using a predetermined formula, other than using the threshold value table.

Next, a comparison is made by the CPU 75 whether the absolute value of difference between the subject distance "A" and subject distance "B" is smaller than a predetermined threshold value (step S67). If the comparison result is positive (step S67: YES), the average value of the subject distance "A" and subject distance "B" is calculated, which is adopted as the subject distance (step S68), and the subject distance detection process is terminated. If the comparison result is negative (step S67: NO), the process returns to step S61.

In this way, by setting the allowable range of absolute value of difference between the subject distance "A" calculated from the size of a face and subject distance "B" measured by the distance measuring sensor 81 using a threshold value set according to the face size, the allowable range of absolute value of difference (between the subject distance "A" and subject distance "B") may be varied.

What is claimed is:

1. A distance measuring apparatus, comprising:
    an obtaining means for obtaining image data through imaging;
    a detection means for detecting a target subject from the image data;
    a calculation means for calculating the distance to the target subject based on the size of the target subject;
    a distance measuring means for measuring the distance to the target subject;
    a determination means for determining a distance, which is based on the distance to the target subject calculated by the calculation means according to the size of the detected target subject and/or the distance to the target subject measured by the distance measuring means, as the subject distance,
    wherein, the determination means determines the average value of the distance to the target subject calculated by the calculation means and the distance to the target subject measured by the distance measuring means as the subject distance, when the size of the detected target subject is greater than a predetermined size, and the absolute value of difference between the distance to the target subject calculated by the calculation means and the distance to the target subject measured by the distance measuring means is smaller than a predetermined threshold value.

2. The distance measuring apparatus according to claim 1, wherein, the determination means determines the distance to the target subject measured by the distance measuring means as the subject distance, when the size of the detected target subject is smaller than or equal to the predetermined size.

3. The distance measuring apparatus according to claim 1, wherein:
the apparatus further comprises a threshold setting means for setting a threshold value based on the size of the target subject; and
the determination means determines the average value of the distance to the target subject calculated by the calculation means and the distance to the target subject measured by the distance measuring means as the subject distance, when the absolute value of difference between the distance to the target subject calculated by the calculation means and the distance to the target subject measured by the distance measuring means is smaller than the predetermined threshold value set by the threshold setting means.

4. A distance measuring method for use with a distance measuring apparatus comprising:
an obtaining means for obtaining image data through imaging;
a detection means for detecting a target subject from the image data;
a calculation means for calculating the distance to the target subject based on the size of the target subject; and
a distance measuring means for measuring the distance to the target subject,
determination means for determining a distance, which is based on the distance to the target subject calculated by the calculation means according to the size of the detected target subject and/or the distance to the target subject measured by the distance measuring means, is determined as the subject distance,
wherein, the determination means determines the average value of the distance to the target subject calculated by the calculation means and the distance to the target subject measured by the distance measuring means as the subject distance, when the size of the detected target subject is greater than a predetermined size, and the absolute value of difference between the distance to the target subject calculated by the calculation means and the distance to the target subject measured by the distance measuring means is smaller than a predetermined threshold value.

* * * * *